(12) United States Patent
Kosuge et al.

(10) Patent No.: US 9,818,550 B2
(45) Date of Patent: Nov. 14, 2017

(54) SOLID ELECTROLYTIC CAPACITOR MANUFACTURING METHOD AND SOLID ELECTROLYTIC CAPACITOR

(71) Applicant: Panasonic Intellectual Property Management Co., Ltd., Osaka (JP)

(72) Inventors: Keiko Kosuge, Kyoto (JP); Masahiro Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 119 days.

(21) Appl. No.: 14/659,807

(22) Filed: Mar. 17, 2015

(65) Prior Publication Data
US 2015/0187509 A1    Jul. 2, 2015

Related U.S. Application Data

(63) Continuation of application No. PCT/JP2013/005626, filed on Sep. 24, 2013.

(30) Foreign Application Priority Data

Sep. 26, 2012  (JP) .................. 2012-212781
Sep. 26, 2012  (JP) .................. 2012-212782

(51) Int. Cl.
*H01G 9/15*   (2006.01)
*H01G 9/028*  (2006.01)

(52) U.S. Cl.
CPC .............. *H01G 9/15* (2013.01); *H01G 9/028* (2013.01)

(58) Field of Classification Search
CPC .................................. H01G 9/00; H01G 9/15
See application file for complete search history.

(56) References Cited

U.S. PATENT DOCUMENTS

| 2005/0069780 A1 | 3/2005 | Kinouchi et al. |
| 2006/0181835 A1 | 8/2006 | Murakami et al. |
| 2008/0304208 A1 | 12/2008 | Murakami et al. |

(Continued)

FOREIGN PATENT DOCUMENTS

| CN | 102169758 | 8/2011 |
| EP | 1449886 | 8/2004 |

(Continued)

OTHER PUBLICATIONS

International Search Report of PCT application No. PCT/JP2013/005626 dated Dec. 24, 2013.

(Continued)

*Primary Examiner* — Seahvosh Nikmanesh
(74) *Attorney, Agent, or Firm* — McDermott Will & Emery LLP

(57) ABSTRACT

A method for manufacturing a solid electrolytic capacitor which includes a capacitor element including: an positive electrode body with a dielectric film formed on a surface thereof; and a solid electrolyte layer formed over the positive electrode body, the method including the steps of: forming the dielectric film on the surface of the positive electrode body; forming the solid electrolyte layer on the dielectric film; heating and melting an ionic compound; impregnating the positive electrode body, on which the solid electrolyte layer is formed, with the melted ionic compound; and cooling and solidifying the ionic compound after impregnating the positive electrode body with the ionic compound.

17 Claims, 7 Drawing Sheets

(56) References Cited

U.S. PATENT DOCUMENTS

2009/0212253 A1   8/2009  Kinouchi et al.
2011/0211294 A1   9/2011  Ueda

FOREIGN PATENT DOCUMENTS

| JP | 2004-031307 | 1/2004 |
| JP | 2006-024708 | 1/2006 |
| JP | 2008-016835 | 1/2008 |
| JP | 2008-141160 | 6/2008 |
| JP | 2008-283136 | 11/2008 |
| JP | 2011-181610 | 9/2011 |
| WO | 2005/012599 | 2/2005 |

OTHER PUBLICATIONS

English Translation of Chinese Search Report dated Jan. 18, 2016 for the related Chinese Patent Application No. 201380050356.X.

SOLID ELECTROLYTIC CAPACITOR MANUFACTURING METHOD AND SOLID ELECTROLYTIC CAPACITOR

RELATED APPLICATIONS

This application is a Continuation of International Application No. PCT/JP2013/005626, filed on Sep. 24, 2013, which in turn claims priority from Japanese Patent Application No. 2012-212781, filed on Sep. 26, 2012 and Japanese Patent Application No. 2012-212782, filed on Sep. 26, 2012, the contents of all of which are incorporated herein by reference in their entireties.

TECHNICAL FIELD

The present disclosure relates to a method for manufacturing a solid electrolytic capacitor and a solid electrolytic capacitor.

BACKGROUND

A solid electrolytic capacitor has been known as a capacitor suitable for size reduction, and a solid electrolytic capacitor having a solid electrolyte layer made of a conductive polymer has been widely used. For the solid electrolytic capacitor, studies on improving restoration capability in a dielectric film have been conducted by adding an ionic liquid to a solid electrolyte (see, for example, International Publication No. WO 2005/012599, Unexamined Japanese Patent Publication No. 2006-24708, Unexamined Japanese Patent Publication No. 2008-16835, and Unexamined Japanese Patent Publication No. 2008-283136). Here, the ionic liquid is a salt that is melted and kept in a liquid state under an ordinary-temperature environment. The ionic liquid has properties such as non-volatility or high ionic conductivity.

SUMMARY

A first method for manufacturing a solid electrolytic capacitor according to the present disclosure is a method for manufacturing a solid electrolytic capacitor which includes a capacitor element including: a positive electrode body on which a dielectric film is formed; and a solid electrolyte layer formed on the positive electrode body, the method including the steps of: forming the dielectric film on the positive electrode body; forming the solid electrolyte layer; heating and melting an ionic compound; impregnating the positive electrode body with the melted ionic compound; and cooling and solidifying the ionic compound after impregnating the positive electrode body with the ionic compound.

A second method for manufacturing a solid electrolytic capacitor according to the present disclosure is a method for manufacturing a solid electrolytic capacitor which includes a capacitor element including: a positive electrode body on which a dielectric film is formed; and a solid electrolyte layer formed on the positive electrode body, the method including the steps of: forming the dielectric film on the positive electrode body; and impregnating the positive electrode body, on which the dielectric film is formed, with a liquid composition monomer containing a conductive polymer or a precursor of a conductive polymer, an oxidant, and an ionic compound having a melting point of 30° C. or higher, to form the solid electrolyte layer made of the conductive polymer, wherein the positive electrode body on which the dielectric film is formed is impregnated with the ionic compound in a melted state.

DESCRIPTION OF EMBODIMENTS

Figure 1:
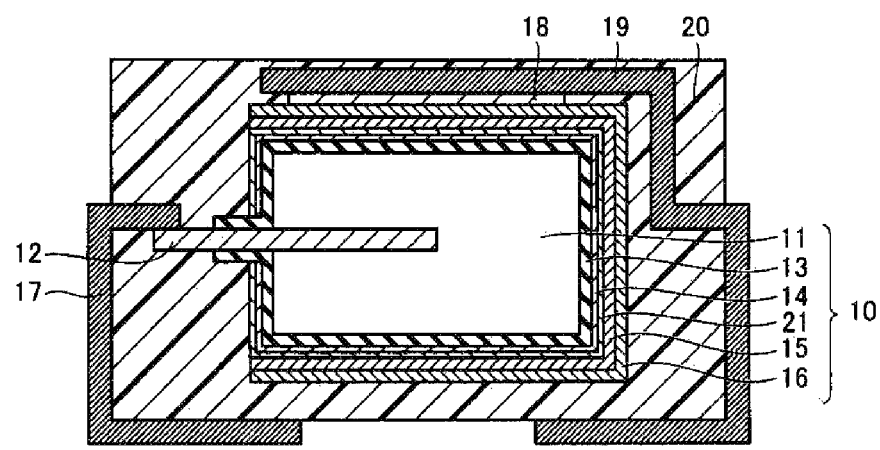
FIG. 1 is a sectional view showing a configuration of a solid electrolytic capacitor according to one exemplary embodiment of the present disclosure.

Problems which exemplary embodiments of this disclosure intend to solve are as follows.

It may be difficult to effectively capture an ionic liquid in a solid electrolyte or the like. Therefore, although an ionic liquid is added to a solid electrolyte, it may be hard to improve restoration capability in a dielectric film.

The present disclosure has been devised in view of the above-mentioned situation, and the present disclosure provides a method for manufacturing a solid electrolytic capacitor which has excellent restoration capability in a dielectric film and excellent electrical properties, and provides such a solid electrolytic capacitor.

A solid electrolytic capacitor and a method for manufacturing the solid electrolytic capacitor according to the present disclosure are described below with reference to the drawings. In the drawings of the present disclosure, the same reference marks denote the same parts or equivalent parts. Dimensional relationships of length, width, thickness, depth and so on are appropriately changed for clarification and simplification of the drawings, and do not reflect actual dimensional relationships.

First Exemplary Embodiment

Configuration of Solid Electrolytic Capacitor

FIG. 1 is a sectional view showing a configuration of a solid electrolytic capacitor according to a first exemplary embodiment of the present disclosure. The solid electrolytic capacitor according to this exemplary embodiment comprises positive electrode body 11; positive electrode lead 12 planted at one end of positive electrode body 11; dielectric film 13 formed on a surface of positive electrode body 11; first solid electrolyte layer 14 formed on dielectric film 13; second solid electrolyte layer 21 formed on first solid electrolyte layer 14; carbon layer 15 formed on second solid electrolyte layer 21; and silver paint layer 16 formed on carbon layer 15. Positive electrode body 11, positive electrode lead 12, dielectric film 13, first solid electrolyte layer 14, second solid electrolyte layer 21, carbon layer 15 and silver paint layer 16 constitute capacitor element 10. Carbon layer 15 and silver paint layer 16 constitute a negative electrode lead-out layer. First solid electrolyte layer 14 contains an ionic compound described later.

Positive electrode terminal 17 is connected to positive electrode lead 12. Negative electrode terminal 19 is connected to silver paint layer 16 through adhesive layer 18 made of a conductive adhesive. Capacitor element 10 is sealed with outer packaging resin 20 so that a part of positive electrode terminal 17 and a part of negative electrode terminal 19 are exposed. A portion of each of positive electrode terminal 17 and negative electrode terminal 19, which is exposed from outer packaging resin 20, is bent so as to extend along a surface of outer packaging resin 20.

[Method for Manufacturing Solid Electrolytic Capacitor]

Figure 2:
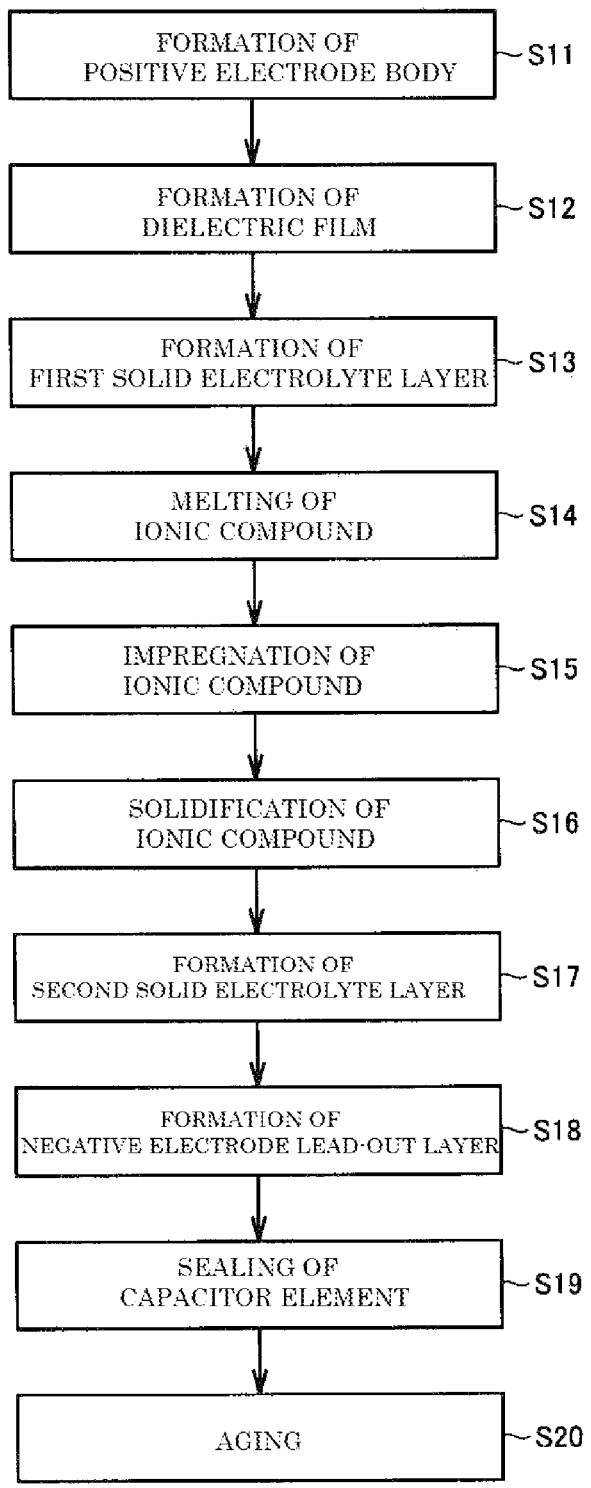
FIG. 2 is a flow chart showing one example of a method for manufacturing the solid electrolytic capacitor according to first exemplary embodiment.

FIG. 2 is a flow chart showing a method for manufacturing a solid electrolytic capacitor according to this exemplary embodiment.

(Formation of Positive Electrode Body)

First, positive electrode body 11 is formed in step S11 in FIG. 2. For example, a metal powder is prepared, and the metal powder is molded into a desired shape while one end part of rod-shaped positive electrode lead 12 is embedded in the metal powder. Next, the molded product of the metal powder is sintered to form positive electrode body 11 of porous structure in which one end part of positive electrode lead 12 is embedded.

A material of positive electrode body 11 is not particularly limited, but it is preferred to use a valve metal such as tantalum, niobium, titanium or aluminum because dielectric film 13 is easily formed on the valve metal. A material of positive electrode lead 12 is not particularly limited, but it is preferred to use a valve metal from the same viewpoint as in the case of positive electrode body 11.

(Formation of Dielectric Film)

Next, dielectric film 13 is formed on a surface of positive electrode body 11 in step S12 in FIG. 2. A method for forming dielectric film 13 is not particularly limited. For example, when positive electrode body 11 is made of a valve metal, dielectric film 13 can be formed on a surface of positive electrode body 11 by subjecting positive electrode body 11 to an anodizing treatment. As the anodizing treatment, for example, heat treatment may be applied to positive electrode body 11 immersed in an anodizing solution such as an aqueous phosphoric acid solution or an aqueous nitric acid solution, or a voltage may be applied to positive electrode body 11 immersed in the anodizing solution. The surface of positive electrode body 11 can be thereby converted into dielectric film 13. For example, when positive electrode body 11 is made of tantalum (Ta), dielectric film 13 made of $Ta_2O_5$ is formed, and when positive electrode body 11 is made of aluminum (Al), dielectric film 13 made of $Al_2O_3$ is formed.

(Formation of First Solid Electrolyte Layer)

Next, first solid electrolyte layer 14 is formed on dielectric film 13 in step S13 in FIG. 2. A method for forming first solid electrolyte layer 14 is not particularly limited. It is preferred to form first solid electrolyte layer 14 by a chemical polymerization method. As the chemical polymerization method, a liquid phase polymerization method polymerizing a precursor monomer for a polymer that forms first solid electrolyte layer 14 using an oxidant, or a gas phase polymerization method can be used. The thickness of first solid electrolyte layer 14 may be increased by repeatedly performing chemical polymerization. First solid electrolyte layer 14 may be formed by applying onto dielectric film 13 a dispersion dispersed with particles of a conductive polymer.

As the precursor monomer, a compound which forms a conductive polymer containing at least one of an aliphatic compound, an aromatic compound, a heterocyclic compound and a hetero atom-containing compound can be used. More specifically, as the precursor monomer, a compound which forms a conductive polymer such as polythiophene or a derivative thereof, polypyrrole or a derivative thereof, polyaniline or a derivative thereof, or polyfuran or a derivative thereof can be used. As one example of the precursor monomer, 3,4-ethylenedioxythiophene, pyrrole or the like can be used.

The oxidant is not limited as long as the precursor monomer can be polymerized. As the oxidant, for example, at least one of sulfuric acid, hydrogen peroxide and the like can be used.

First solid electrolyte layer 14 may contain a dopant. Examples of the dopant may be acids or salts of sulfonic acid compounds such as alkyl sulfonic acids, aromatic sulfonic acids and polycyclic aromatic sulfonic acids. An aromatic sulfonic acid metal salt having a function of both an oxidant and a dopant, or the like, can also be used.

(Melting of Ionic Compound)

Next, an ionic compound is melted in step S14 in FIG. 2. A method for melting an ionic compound is not particularly limited, but it is preferred to raise a temperature of an ionic compound up to a temperature not lower than the melting point of the ionic compound, using a heat source such as a heater.

The ionic compound is not melted in a step which is impregnation of a liquid conducted immediately after the step of impregnation of the ionic compound into positive electrode body 11 (hereinafter, referred to as a "step of impregnation of a liquid immediately after impregnation of an ionic compound"). In other words, the melting point of the ionic compound is higher than the temperature in the step of impregnation of a liquid immediately after impregnation of an ionic compound. Consequently, in the step of impregnation of a liquid immediately after impregnation of an ionic compound, melting of the ionic compound can be prevented, so that the ionic compound can be prevented from flowing out of positive electrode body 11 on which first solid electrolyte layer 14 is formed. In this exemplary embodiment, the step of impregnation of a liquid immediately after impregnation of an ionic compound is a step of forming second solid electrolyte layer 21 (step S17 in FIG. 2), and therefore the melting point of the ionic compound is higher than the temperature at which second solid electrolyte layer 21 is formed (the temperature of an electrolytic polymerization solution in a step of formation of second solid electrolyte layer 21).

The ionic compound may be melted in a step performed after the step of impregnation of a liquid immediately after impregnation of an ionic compound, and is preferably melted in an aging step (step 20 in FIG. 2) described later. In other words, the melting point of the ionic compound may be not higher than the temperature in a step conducted after the step of impregnation of a liquid immediately after impregnation of an ionic compound, and is preferably not higher than the treatment temperature in the aging step. Thereby, in the aging step or the like, the ionic compound is melted to restore defects of dielectric film 13.

When the step of forming second solid electrolyte layer 21, or the like is performed at ordinary temperature, the melting point of the ionic compound is preferably 30° C. or higher. When the step of forming second solid electrolyte layer 21, or the like is performed at a temperature equal to or lower than ordinary temperature, an ionic liquid can be used as the ionic compound. The ionic liquid is not particularly limited, and a known ionic liquid can be used as long as the melting point thereof is higher than the temperature at which second solid electrolyte layer 21 is formed. Considering that the aging step is generally performed at 100° C. or higher, the melting point of the ionic compound is preferably 100° C. or lower. When the melting point of the ionic compound is 100° C. or lower, deterioration of properties of a conductive polymer, which is caused by combination of the conductive polymer and the ionic compound, can be prevented, and safety in operation can be secured.

Preferably, the ionic compound has hydrophilicity. Here, the meaning that the ionic compound has hydrophilicity is that the ionic compound contains as a hydrophilic group at least one of a hydroxyl group, a carboxyl group, a sulfonic acid group, and a phosphonic acid group.

The ionic compound includes a cation and an anion. As the cation of the ionic compound, a cation having quaternary nitrogen can be used, and particularly a compound containing an ammonium ion as a cation is preferred. The ammonium ion is not particularly limited, and four substituents bound to a nitrogen atom may individually be an alkyl group such as a methyl group, or an alkyl group containing a hydroxyl group, a carboxyl group or the like. The anion of the ionic compound is not particularly limited, and a sulfonyl imide ion, a halide ion, a sulfonate ion, a phosphate ion, a borate ion or the like can be used. Particularly, a tetrafluoroborate ion, a hexafluorophosphate ion, a p-toluenesulfonate ion or a bis(trifluoromethanesulfonyl)imide ion can be preferably used.

(Impregnation of Ionic Compound)

Next, positive electrode body 11 on which first solid electrolyte layer 14 is formed is impregnated with the melted ionic compound in step S15 in FIG. 2. A method for impregnation of the melted ionic compound is not particularly limited. For example, positive electrode body 11 may be immersed in the melted ionic compound, or the melted ionic compound may be applied to first solid electrolyte layer 14 of positive electrode body 11. It is preferred to keep the ionic compound at a temperature not lower than the melting point of the ionic compound during immersion in the melted ionic compound or during application of the melted ionic compound.

Conditions for impregnation of the ionic compound are not particularly limited, and as one example of conditions for impregnation of the ionic compound, the time for immersion in the melted ionic compound or the time for application of the melted ionic compound may be set to 1 minute or more. Positive electrode body 11 on which first solid electrolyte layer 14 is formed can be thereby sufficiently impregnated with the melted ionic compound. The immersion time or application time is preferably 60 minutes or less from the viewpoint of manufacturing tact. The impregnation time or application time is more preferably 3 minutes or more and 10 minutes or less, and an impregnating ability of the melted ionic compound and manufacturing tact can be more properly designed.

(Solidification of Ionic Compound)

Next, the ionic compound with which positive electrode body 11 is impregnated is solidified in step S16 in FIG. 2. A method for solidifying the ionic compound is not particularly limited. For example, the ionic compound may be cooled so that the ionic compound has a temperature not higher than the melting point of the ionic compound. A method for cooling the ionic compound can be appropriately selected according to the melting point of the ionic compound. For example, positive electrode body 11 impregnated with the ionic compound may be left standing at ordinary temperature for a certain period of time (e.g. 10 minutes or more), or positive electrode body 11 impregnated with the ionic compound may be actively cooled using a cooling device such as a cooler.

(Formation of Second Solid Electrolyte Layer)

Next, second solid electrolyte layer 21 is formed in step S17 in FIG. 2. Second solid electrolyte layer 21 can be formed using chemical polymerization, electrolytic polymerization, a method including applying a dispersion dispersed with particles of a conductive polymer, or the like, and particularly it is preferred to form second solid electrolyte layer 21 by an electrolytic polymerization method.

Preferably, the method for forming second solid electrolyte layer 21 by an electrolytic polymerization method includes a step of impregnating positive electrode body 11, on which first solid electrolyte layer 14 is formed, with an electrolytic polymerization solution containing a precursor monomer for second solid electrolyte layer 21 and a dopant. The method for impregnation of the electrolytic polymerization solution is, for example, a method that positive electrode body 11, on which first solid electrolyte layer 14 is formed, is immersed in the electrolytic polymerization solution, and second solid electrolyte layer 21 is formed on first solid electrolyte layer 14 by supplying an electric current through first solid electrolyte layer 14. The precursor monomer for second solid electrolyte layer 21 and the dopant are not particularly limited, and the precursor monomer and the dopant in the step of forming first solid electrolyte layer 14 (step S13 in FIG. 2) can be used. Polymerization conditions in the electrolytic polymerization method are not particularly limited, and known polymerization conditions for forming a solid electrolyte layer of a solid electrolytic capacitor by an electrolytic polymerization method can be applied.

The melting point of the ionic compound is higher than the temperature of the electrolytic polymerization solution in the step of impregnation of the electrolytic polymerization solution. Therefore, in this step, melting of the ionic compound can be prevented, so that the ionic compound can be prevented from flowing out of positive electrode body 11 on which first solid electrolyte layer 14 is formed.

As a solvent of the electrolytic polymerization solution, an aqueous solvent is often used. Therefore, when the ionic compound has hydrophilicity, affinity of the ionic compound with the electrolytic polymerization solution can be secured in the step of impregnation of the electrolytic polymerization solution in this step. Accordingly, it can be restrained that formation of second solid electrolyte layer 21 on first solid electrolyte layer 14 becomes difficult because of the impregnation of the ionic compound to first solid electrolyte layer 14.

(Formation of Negative Electrode Lead-Out Layer)

Next, a negative electrode lead-out layer including carbon layer 15 and silver paint layer 16 is formed on second solid electrolyte layer 21 in step S18 in FIG. 2.

A method for forming the negative electrode lead-out layer is not particularly limited, but a method including the steps of; applying a liquid containing a carbon powder on second solid electrolyte layer 21; and applying a liquid containing a metal powder on carbon layer 15 is preferred. Carbon layer 15 can be formed on second solid electrolyte layer 21 by, for example, immersing positive electrode body 11, on which second solid electrolyte layer 21 is formed, in a liquid with carbon particles dispersed therein, and then performing drying treatment. Silver paint layer 16 can be formed on carbon layer 15 by immersing positive electrode body 11, on which carbon layer 15 is formed, in a liquid containing silver particles, and then performing drying treatment.

Through the above steps, capacitor element 10 is manufactured. Thus, in this exemplary embodiment, the ionic compound, with which first solid electrolyte layer 14 is impregnated, is trapped in second solid electrolyte layer 21. Therefore, capacitor element 10 can be manufactured without causing outflow of the ionic compound.

(Sealing of Capacitor Element)

Next, capacitor element 10 is sealed in step S19 in FIG. 2. An example of the sealing method is, but is not limited to, the method described below. That is, first, one end of positive electrode terminal 17 is connected to one end of positive electrode lead 12 exposed from positive electrode body 11. Adhesive layer 18 is formed on silver paint layer 16, and one end of negative electrode terminal 19 is connected to silver paint layer 16 by adhesive layer 18. Next, capacitor element 10 is sealed with outer packaging resin 20 so that the other end of each of positive electrode terminal 17 and negative electrode terminal 19 is exposed. Finally, exposed positive electrode terminal 17 and negative electrode terminal 19 are bent so as to extend along outer packaging resin 20.

(Aging)

Next, an aging treatment is performed in step S20 in FIG. 2. An example of the aging treatment method is, but is not particularly limited to, a method including applying a predetermined voltage (e.g. a rated voltage) to positive electrode body 11 and the negative electrode lead-out layer, and holding positive electrode body 11 and the negative electrode lead-out layer at a predetermined temperature (e.g. 120° C.) for a certain period of time.

The melting point of the ionic compound is preferably not higher than the treatment temperature in the aging step. In other words, it is preferred to perform the aging step at a temperature not lower than the melting point of the ionic compound. Accordingly, in the aging step, the ionic compound is melted to restore defects of dielectric film 13. Therefore, an effect obtained by adding the ionic compound can be effectively exerted. In this way, the solid electrolytic capacitor shown in FIG. 1 is manufactured.

As described above, in the method for manufacturing a solid electrolytic capacitor according to this exemplary embodiment, the ionic compound, with which first solid electrolyte layer 14 is impregnated, is trapped in second solid electrolyte layer 21, and therefore the concentration of the ionic compound in the solid electrolyte layer can be kept high. The ionic compound is solid at ordinary temperature, but during use of the solid electrolytic capacitor, etc., a leak current causes capacitor element 10 to generate heat, so that the ionic compound can be melted to restore dielectric film 13. Accordingly, a solid electrolytic capacitor which has excellent in restoration capability of a dielectric film and excellent in electrical properties can be manufactured.

In the manufactured solid electrolytic capacitor, first solid electrolytic layer 14 is impregnated with the ionic compound, and the ionic compound has ion conductivity, and therefore can also serve as an electrolytic solution. Accordingly, the capacity of the solid electrolytic capacitor can be increased.

Further, since the ionic compound has hydrophilicity, uniformity of the solid electrolyte layer can be improved, so that a solid electrolytic capacitor excellent in electrical properties can be manufactured.

Second Exemplary Embodiment

In the second exemplary embodiment of the present disclosure, a solid electrolytic capacitor which does not have the second solid electrolyte layer, and a method for manufacturing the solid electrolytic capacitor are described. Hereinafter, aspects different from those of the first exemplary embodiment are mainly described.

[Configuration of Solid Electrolytic Capacitor]

Figure 3:
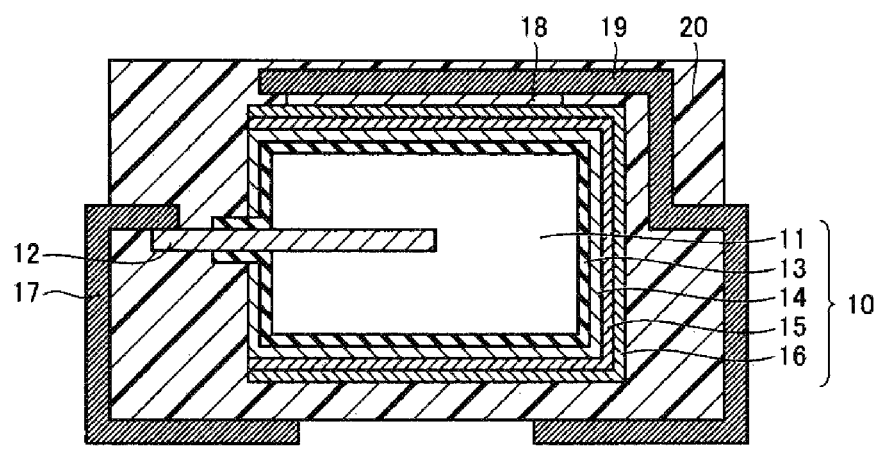
FIG. 3 is a sectional view showing a configuration of a solid electrolytic capacitor according to another exemplary embodiment of the present disclosure.

FIG. 3 is a sectional view showing a configuration of a solid electrolytic capacitor according to this exemplary embodiment. In the solid electrolytic capacitor according to this exemplary embodiment, a negative electrode lead-out layer including carbon layer 15 and silver paint layer 16 is formed on first solid electrolyte layer 14.

[Method for Manufacturing Solid Electrolytic Capacitor]

Figure 4:
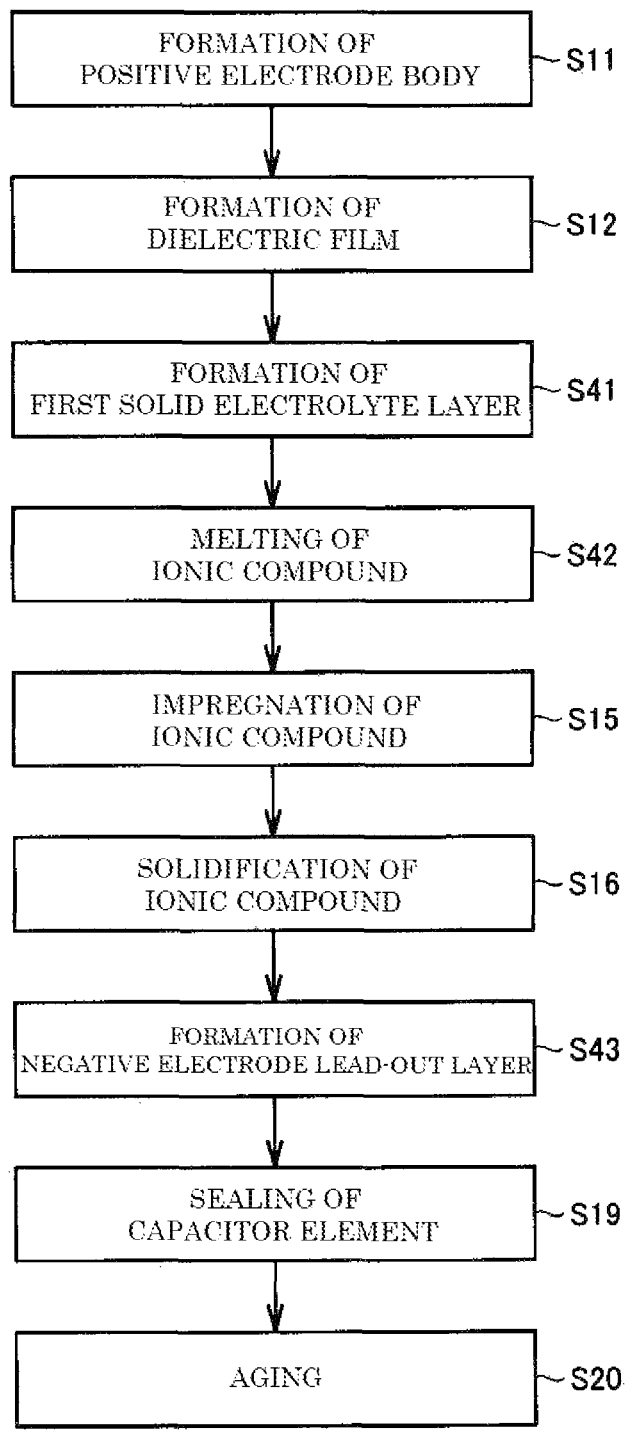
FIG. 4 is a flow chart showing one example of a method for manufacturing the solid electrolytic capacitor according to second exemplary embodiment.

FIG. 4 is a flow chart showing one example of a method for manufacturing a solid electrolytic capacitor according to this exemplary embodiment. In the method for manufacturing a solid electrolytic capacitor as shown in FIG. 4, a step of impregnation of a liquid immediately after impregnation of an ionic compound is a step of forming a negative electrode lead-out layer (step S43 in FIG. 4), and first, a step of forming positive electrode body 11 (step S11 in FIG. 4) and a step of forming dielectric film 13 (step S12 in FIG. 4) are sequentially performed in accordance with the method described in the first exemplary embodiment.

(Formation of First Solid Electrolyte Layer)

Next, first solid electrolyte layer 14 is formed on dielectric film 13 in step S41 in FIG. 4. A method for forming first solid electrolyte layer 14 is not particularly limited. For example, first solid electrolyte layer 14 may be formed by a chemical polymerization method, and in this case, first solid electrolyte layer 14 can be formed in accordance with the method for forming first solid electrolyte layer 14 as described in the first exemplary embodiment. First solid electrolyte layer 14 may also be formed by an electrolytic polymerization method, and in this case, first solid electrolyte layer 14 can be formed in accordance with the method for forming second solid electrolyte layer 21 as described in the first exemplary embodiment. When first solid electrolyte layer 14 is formed by an electrolytic polymerization method, it is preferred to form a conductive pre-coat layer on dielectric film 13, and then form first solid electrolyte layer 14 on the pre-coat layer. First solid electrolyte layer 14 may be formed by applying a dispersion dispersed with particles of a conductive polymer onto dielectric film 13.

(Melting of Ionic Compound)

Next, the ionic compound is melted in step S42 in FIG. 4. The method for melting the ionic compound is as described in the first exemplary embodiment. The ionic compound is not particularly limited, and the ionic compounds listed in the first exemplary embodiment can be used.

When the ionic compound is melted, a step of impregnation of the ionic compound (step S15 in FIG. 4) and a step of solidifying the ionic compound (step S16 in FIG. 4) are sequentially performed in accordance with the method described in the first exemplary embodiment.

(Formation of Negative Electrode Lead-Out Layer)

Next, a negative electrode lead-out layer including carbon layer 15 and silver paint layer 16 is formed on first solid electrolyte layer 14 in step S43 in FIG. 4. A method for forming carbon layer 15 and a method for forming silver paint layer 16 are not particularly limited, and the method for forming carbon layer 15 and the method for forming silver paint layer 16 as described in the first exemplary embodiment can be used.

In the method for manufacturing a solid electrolytic capacitor as shown in FIG. 4, the melting point of the ionic compound is higher than the temperature of a liquid containing a carbon powder and is higher than the temperature of a liquid containing a metal powder in a step of the formation of negative electrode lead-out layer. Therefore, in this step, melting of the ionic compound can be prevented, so that the ionic compound can be prevented from flowing out of positive electrode body 11 on which first solid electrolyte layer 14 is formed.

Preferably, the ionic compound has hydrophilicity when the liquid containing a carbon powder or the liquid containing a metal powder contains a polar solvent such as water. Preferably, the ionic compound has hydrophobicity when the liquid containing a carbon powder or the liquid containing a metal powder contains a nonpolar solvent such as an organic solvent. Affinity of the ionic compound with the liquid containing a carbon powder and the liquid containing a metal powder can be thereby secured in a step of impregnation of the liquid containing a carbon powder and a step of impregnation of the liquid containing a metal powder in this step. Accordingly, it can be restrained that formation of the negative electrode lead-out layer on first solid electrolyte layer 14 becomes difficult because of the impregnation of the ionic compound to first solid electrolyte layer 14.

When the negative electrode lead-out layer is formed, a step of sealing capacitor element 10 (step S19 in FIG. 4) and an aging step (step S20 in FIG. 4) are sequentially performed in accordance with the method described in the first exemplary embodiment. In this way, the solid electrolytic capacitor according to this exemplary embodiment is manufactured.

In the method for manufacturing a solid electrolytic capacitor as shown in FIG. 4, the melting point of the ionic compound is higher than the temperature of a liquid containing a carbon powder and is higher than the temperature of a liquid containing a metal powder in a step of the formation of negative electrode lead-out layer, and is preferably equal to or lower than the treatment temperature in the aging step. Accordingly, capacitor element 10 can be manufactured without causing outflow of the ionic compound. In the manufactured solid electrolytic capacitor, the ionic compound can also serve as an electrolytic solution. Therefore, an effect similar to that in the first exemplary embodiment can be obtained when a solid electrolytic capacitor is manufactured in accordance with the method for manufacturing a solid electrolytic capacitor as shown in FIG. 4.

Figure 5:
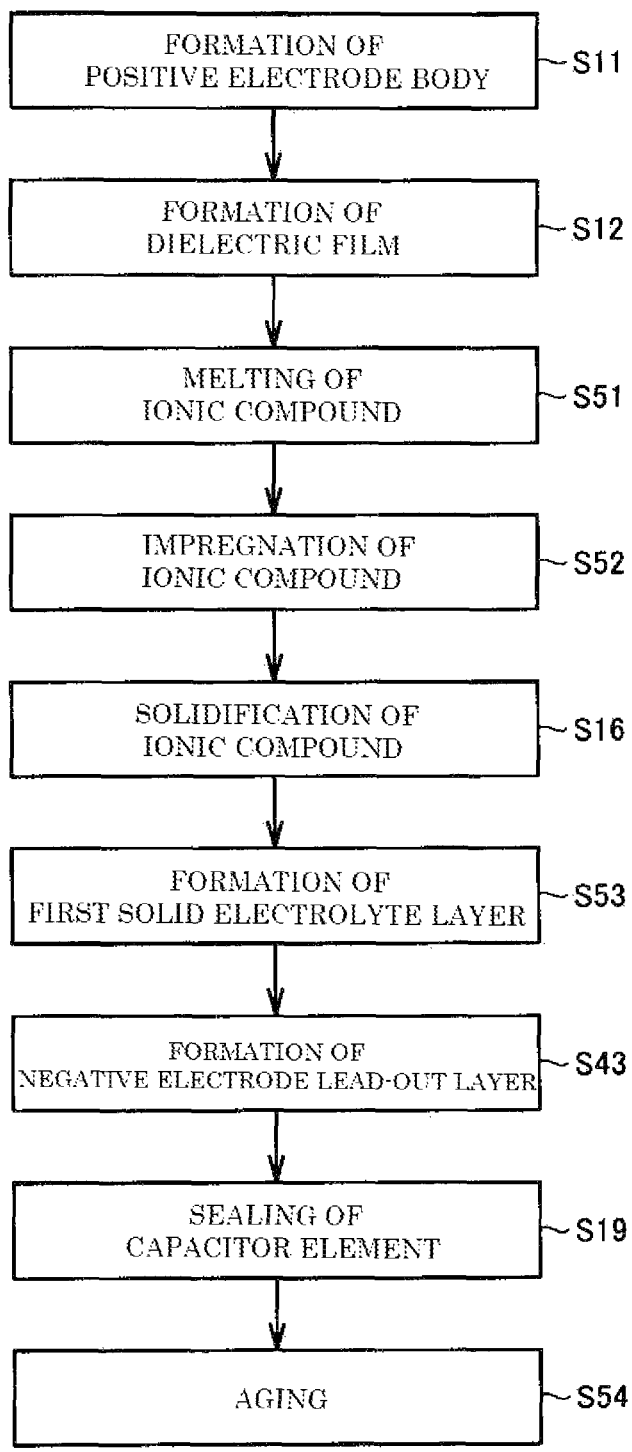
FIG. 5 is a flow chart showing another example of a method for manufacturing the solid electrolytic capacitor according to second exemplary embodiment.

The method for manufacturing the solid electrolytic capacitor shown in FIG. 3 is not limited to the method shown in FIG. 4, and may be, for example, the method shown in FIG. 5. FIG. 5 is a flow chart showing another example of the method for manufacturing a solid electrolytic capacitor according to this exemplary embodiment. In the method for manufacturing a solid electrolytic capacitor as shown in FIG. 5, a step of impregnation of a liquid immediately after impregnation of an ionic compound is a step of forming first solid electrolyte layer 14 (step S53 in FIG. 5), and first, a step of forming positive electrode body 11 (step S11 in FIG. 5) and a step of forming dielectric film 13 (step S12 in FIG. 5) are sequentially performed in accordance with the method described in the first exemplary embodiment.

(Melting of Ionic Compound)

Next, the ionic compound is melted in step S51 in FIG. 5. The method for melting the ionic compound is as described in the first exemplary embodiment. The ionic compound is not particularly limited, and the ionic compounds listed in the first exemplary embodiment can be used.

(Impregnation of Ionic Compound)

Next, positive electrode body 11 on which dielectric film 13 is formed is impregnated with the melted ionic compound in step S52 in FIG. 5. The method for impregnation of the melted ionic compound and conditions for impregnation of the melted ionic compound are not particularly limited, and the method for impregnation of the ionic compound and conditions for impregnation of the ionic compound as described in the first exemplary embodiment can be used.

When positive electrode body 11 is impregnated with the melted ionic compound, a step of solidifying the ionic compound (step S16 in FIG. 5) is performed in accordance with the method described in the first exemplary embodiment.

(Formation of First Solid Electrolyte Layer)

Next, first solid electrolyte layer 14 is formed on dielectric film 13 in step S53 in FIG. 5. The method for forming first solid electrolyte layer 14 is not particularly limited, and first solid electrolyte layer 14 may be formed by a chemical polymerization method, or first solid electrolyte layer 14 may be formed by an electrolytic polymerization method. First solid electrolyte layer 14 can also be formed by applying onto dielectric film 13 a dispersion dispersed with particles of a conductive polymer.

When first solid electrolyte layer 14 is formed by a chemical polymerization method, the melting point of the ionic compound is higher than the temperature of a polymerization solution, which is used in chemical polymerization, in a step of the formation of first solid electrolyte layer. Similarly, when first solid electrolyte layer 14 is formed by an electrolytic polymerization method, the melting point of the ionic compound is higher than the temperature of a polymerization solution, which is used in electrolytic polymerization, in a step of the formation of first solid electrolyte layer. Accordingly, in this step, melting of the ionic compound can be prevented irrespective of a method for forming first solid electrolyte layer 14, so that the ionic compound can be prevented from flowing out of positive electrode body 11 on which dielectric film 13 is formed.

Preferably, the ionic compound has hydrophilicity when the polymerization solution contains a polar solvent such as water. Preferably, the ionic compound has hydrophobicity when the polymerization solution contains a nonpolar solvent such as an organic solvent. Affinity of the ionic compound with the polymerization solution can be thereby secured in the step of impregnation of the polymerization solution in this step. Accordingly, it can be restrained that formation of first solid electrolyte layer 14 on dielectric film 13 becomes difficult because of the impregnation of the ionic compound to dielectric film 13.

When first solid electrolyte layer 14 is formed, a step of forming a negative electrode lead-out layer (step S43 in FIG. 5) is performed in accordance with the method described in the step of forming a negative electrode lead-out layer as shown in FIG. 4. Thereafter, a step of sealing a capacitor element (step S19 in FIG. 5) is performed in accordance with the method for sealing a capacitor element as described in the first exemplary embodiment.

(Aging)

Next, an aging treatment is performed in step S54 in FIG. 5. The aging treatment method is not particularly limited, and the aging treatment method described in the first exemplary embodiment can be used.

As in the case of the first exemplary embodiment, the aging step is performed at a temperature not lower than the melting point of the ionic compound, and therefore in the aging step, the ionic compound is melted to restore defects of dielectric film 13. In the method for manufacturing a solid electrolytic capacitor as shown in FIG. 5, the ionic compound exists at a high concentration in the vicinity of dielectric film 13, and therefore a function of restoring dielectric film 13 by the ionic compound is improved as compared to a case where mainly first solid electrolyte layer 14 is impregnated with the ionic compound. In this way, the solid electrolytic capacitor according to this exemplary embodiment is manufactured.

In the method for manufacturing a solid electrolytic capacitor as shown in FIG. 5, the melting point of the ionic compound used is higher than the temperature of a polymerization solution, which is used in chemical polymerization, in the step of impregnation of the polymerization solution, or is higher than the temperature of a polymerization solution, which is used in electrolytic polymerization, in the step of impregnation of the polymerization solution, and is preferably equal to or lower than the treatment temperature in the aging step. Accordingly, capacitor element 10 can be manufactured without causing outflow of the ionic compound. In the manufactured solid electrolytic capacitor, the ionic compound can also serve as an electrolytic solution. Therefore, an effect similar to that in the first exemplary embodiment can be obtained when a solid electrolytic capacitor is manufactured in accordance with the method for manufacturing a solid electrolytic capacitor as shown in FIG. 5. In addition, in the method for manufacturing a solid electrolytic capacitor as shown in FIG. 5, the function of restoring dielectric film 13 by the ionic compound is further improved, so that a solid electrolytic capacitor further excellent in function of restoring dielectric film 13 can be manufactured.

Third Exemplary Embodiment

In the third exemplary embodiment of the present disclosure, a solid electrolytic capacitor which do not have second solid electrolyte layer, and a method for manufacturing the solid electrolytic capacitor are described. Hereinafter, aspects different from those of the first exemplary embodiment are mainly described.
[Configuration of Solid Electrolytic Capacitor]

FIG. 3 is a sectional view showing a configuration of the solid electrolytic capacitor according to the third exemplary embodiment of the present disclosure. In the solid electrolytic capacitor according to this exemplary embodiment, a negative electrode lead-out layer including carbon layer 15 and silver paint layer 16 is formed on first solid electrolyte layer 14.
[Method for Manufacturing Solid Electrolytic Capacitor]

Figure 6:
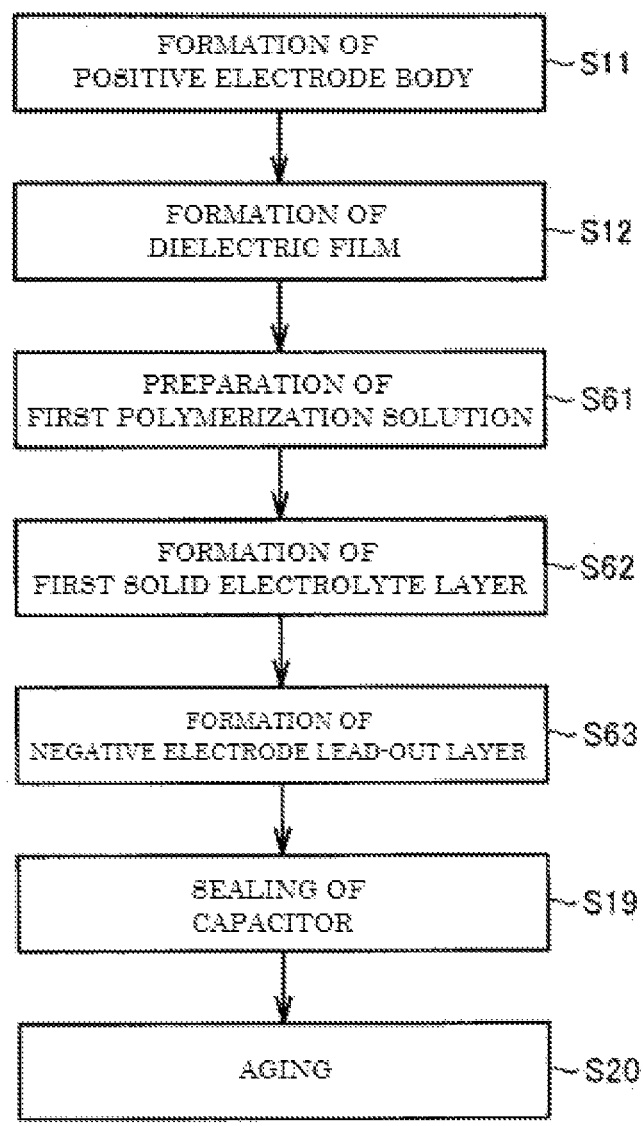
FIG. 6 is a flow chart showing one example of a method for manufacturing the solid electrolytic capacitor according to third exemplary embodiment.

FIG. 6 is a flow chart showing one example of a method for manufacturing a solid electrolytic capacitor according to this exemplary embodiment. In the method for manufacturing a solid electrolytic capacitor according to this exemplary embodiment, first, a step of forming positive electrode body 11 (step S11 in FIG. 6) and a step of forming dielectric film 13 (step S12 in FIG. 6) are sequentially performed in accordance with the method described in the first exemplary embodiment. In this exemplary embodiment, positive electrode body 11 is impregnated with the ionic compound in a step of forming first solid electrolyte layer 14 (step S62 in FIG. 6), and therefore the step of impregnation of a liquid immediately after impregnation of an ionic compound is a step of forming a negative electrode lead-out layer (step S63 in FIG. 6).
(Preparation of First Polymerization Solution)

Next, a first polymerization solution containing a precursor monomer for a conductive polymer, an oxidant and an ionic compound is prepared in step S61 in FIG. 6.

The precursor monomer and the oxidant are not particularly limited, and the precursor monomer and the oxidant described in the first exemplary embodiment can be used. The ionic compound is not particularly limited, and the ionic compound described in the first exemplary embodiment can be used.

The content of each of the precursor monomer and the oxidant in the first polymerization solution may be a known content in formation of a solid electrolyte layer by a chemical polymerization method. The content of the ionic compound in the first polymerization solution is preferably 0.1% by mass or more, more preferably 1% by mass or more and 10% by mass or less.

The first polymerization solution may contain a dopant. The dopant is not particularly limited, and the dopant described in the first exemplary embodiment can be used.
(Formation of First Solid Electrolyte Layer)

Next, first solid electrolyte layer 14 is formed on dielectric film 13 in step S62 in FIG. 6. The method for forming first solid electrolyte layer 14 is not particularly limited, but it is preferred that positive electrode body 11 on which dielectric film 13 is formed is impregnated with the first polymerization solution, and the precursor monomer in the first polymerization solution is polymerized to form first solid electrolyte layer 14. First solid electrolyte layer 14 containing the ionic compound is thereby formed on dielectric film 13 by a chemical polymerization method. As the chemical polymerization method, a liquid phase polymerization method polymerizing a precursor monomer for a polymer that forms first solid electrolyte layer 14 using an oxidant, or a gas phase polymerization method can be used. The thickness of first solid electrolyte layer 14 may be increased by repeatedly performing chemical polymerization.

When positive electrode body 11 on which dielectric film 13 is formed is impregnated with the first polymerization solution, the precursor monomer for a conductive polymer, the oxidant and the ionic compound are not required to be contained in one solution, and may be each contained in a separate solution. When oxidation polymerization is performed using two or more solutions, the order of immersion in each solution is not particularly limited.

For example, the first polymerization solution may contain the precursor monomer for a conductive polymer and the ionic compound while not containing the oxidant, or may contain the oxidant and the ionic compound while not containing the precursor monomer for a conductive polymer. When the first polymerization solution contains the precursor monomer for a conductive polymer and the ionic compound while not containing the oxidant, the precursor monomer and the oxidant may be brought into contact with each other on dielectric film 13 after impregnation of the first polymerization solution is completed.

Preferably, the first polymerization solution is heated at a temperature not lower than the melting point of the ionic compound contained in the first polymerization solution when positive electrode body 11 on which dielectric film 13 is formed is impregnated with the first polymerization solution. Thereby, positive electrode body 11 is impregnated with the ionic compound in a melted state, and therefore positive electrode body 11 is easily impregnated with the ionic compound. The melting point of the ionic compound is 30° C. or higher. Therefore, when positive electrode body 11 on which first solid electrolyte layer 14 is formed is left standing at room temperature, the ionic compound is solidified.

(Formation of Negative Electrode Lead-Out Layer)

Next, a negative electrode lead-out layer including carbon layer 15 and silver paint layer 16 is formed on first solid electrolyte layer 14 in step S63 in FIG. 6. A method for forming carbon layer 15 and a method for forming silver paint layer 16 are not particularly limited, and the method for forming carbon layer 15 and the method for forming silver paint layer 16 as described in the first exemplary embodiment can be used.

The melting point of the ionic compound is higher than the temperature of a suspension liquid containing the carbon powder in a step of applying the suspension liquid. Consequently, in this step, melting of the ionic compound can be prevented, so that the ionic compound can be prevented from flowing out of positive electrode body 11 on which first solid electrolyte layer 14 is formed.

Capacitor element 10 is manufactured through the above steps. Thus, in this exemplary embodiment, capacitor element 10 can be manufactured without causing outflow of the ionic compound.

When the negative electrode lead-out layer has been formed, a step of sealing capacitor element 10 (step S19 in FIG. 6) and an aging step (step S20 in FIG. 6) are sequentially performed in accordance with the method described in the first exemplary embodiment. In this way, the solid electrolytic capacitor according to this exemplary embodiment is manufactured.

As described above, in the method for manufacturing a solid electrolytic capacitor according to this exemplary embodiment, the melting point of the ionic compound is higher than the temperature of a liquid containing a carbon powder in a step of applying the liquid, and is higher than the temperature of a liquid containing a metal powder in a step of applying the liquid. And the melting point of the ionic compound is preferably equal to or lower than the treatment temperature in the aging step. Accordingly, capacitor element 10 can be manufactured without causing outflow of the ionic compound. In the manufactured solid electrolytic capacitor, the ionic compound can also serve as an electrolytic solution. Therefore, an effect similar to that in the first exemplary embodiment can be obtained when a solid electrolytic capacitor is manufactured in accordance with the method for manufacturing a solid electrolytic capacitor as shown in FIG. 6.

Fourth Exemplary Embodiment

In the fourth exemplary embodiment of the present disclosure, a solid electrolytic capacitor having a second solid electrolyte layer, and a method for manufacturing the solid electrolytic capacitor are described. Hereinafter, aspects different from those of the first exemplary embodiment are mainly described.

[Configuration of Solid Electrolytic Capacitor]

FIG. 1 is a sectional view showing a configuration of a solid electrolytic capacitor according to this exemplary embodiment. In the solid electrolytic capacitor according to this exemplary embodiment, second solid electrolyte layer 21 is formed on first solid electrolyte layer 14, and a negative electrode lead-out layer including carbon layer 15 and silver paint layer 16 is formed on second solid electrolyte layer 21.

[Method for Manufacturing Solid Electrolytic Capacitor]

Figure 7:
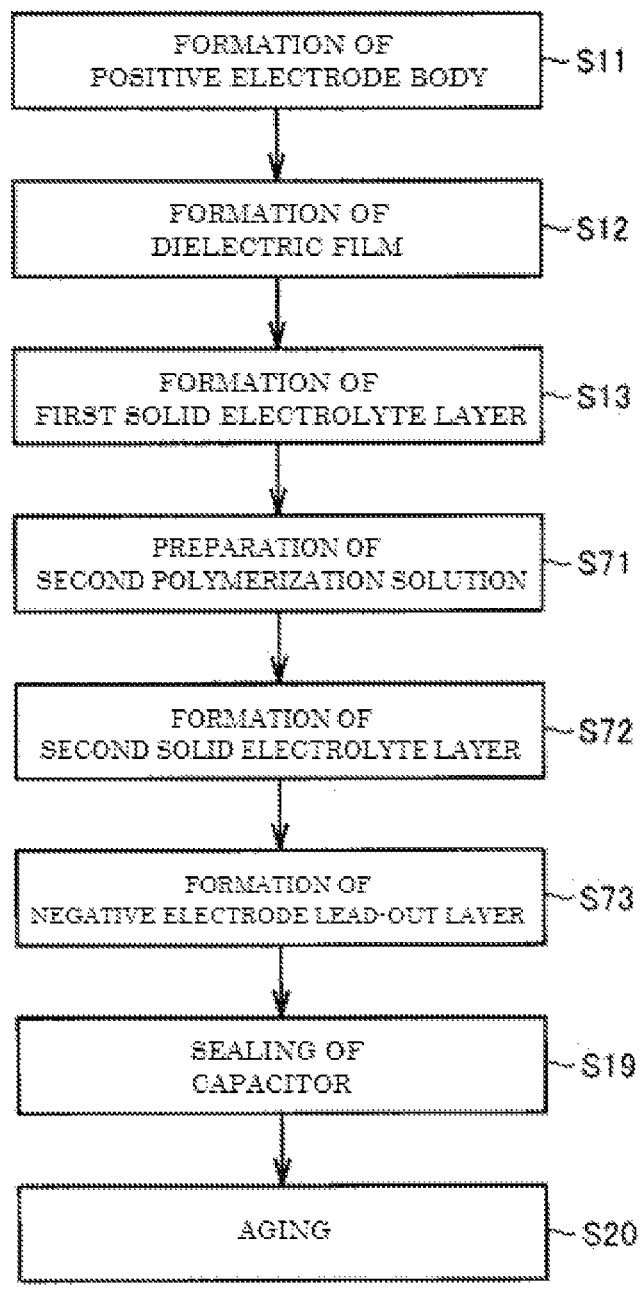
FIG. 7 is a flow chart showing one example of a method for manufacturing the solid electrolytic capacitor according to forth exemplary embodiment.

FIG. 7 is a flow chart showing a method for manufacturing a solid electrolytic capacitor according to this exemplary embodiment. In the method for manufacturing a solid electrolytic capacitor as shown in FIG. 7, a step of forming positive electrode body 11 (step S11 in FIG. 7) and a step of forming dielectric film 13 (step S12 in FIG. 7) are sequentially performed in accordance with the method described in the first exemplary embodiment. In this example, the step of impregnation of a liquid immediately after impregnation of an ionic compound is a step of forming a negative electrode lead-out layer (step S73 in FIG. 7).

(Formation of First Solid Electrolyte Layer)

Next, first solid electrolyte layer 14 is formed on dielectric film 13 in step S13 in FIG. 7. The method for forming first solid electrolyte layer 14 is not particularly limited, but it is preferred to form first solid electrolyte layer 14 by a chemical polymerization method. For example, first solid electrolyte layer 14 can be formed in accordance with the method described in the step of forming first solid electrolyte layer 14 (step S13 in FIG. 2) as described in the first exemplary embodiment.

(Preparation of Second Polymerization Solution)

Next, a second polymerization solution containing a precursor monomer for a conductive polymer and an ionic compound is prepared in S71 in FIG. 7. Here, the precursor monomer for a conductive polymer and the ionic compound are not particularly limited, and the precursor monomer for a conductive polymer and the ionic compound as described in the first exemplary embodiment can be used.

The content of the ionic compound in the second polymerization solution is preferably 0.1% by mass or more, more preferably 1% by mass or more and 10% by mass or less.

Preferably, the ionic compound has hydrophilicity when the second polymerization solution contains a polar solvent such as water. Preferably, the ionic compound has hydrophobicity when the second polymerization solution contains a nonpolar solvent such as an organic solvent. Here, the meaning that the ionic compound has hydrophilicity is that the ionic compound contains at least one of a hydroxyl group, a carboxyl group, a sulfonic acid group, and a phosphonic acid group. Consequently, separation of the ionic compound in the second polymerization solution can be prevented, so that electrolytic polymerization is uniformly performed, and therefore a uniform second solid electrolyte layer can be formed.

(Formation of Second Solid Electrolyte Layer)

Next, second solid electrolyte layer 21 is formed on first solid electrolyte layer 14 in step S72 in FIG. 7. The method for forming second solid electrolyte layer 21 is not particularly limited, but it is preferred that positive electrode body 11 on which first solid electrolyte layer 14 is formed is impregnated with the second polymerization solution to form second solid electrolyte layer 21.

The method for forming second solid electrolyte layer 21 is, for example, a method that positive electrode body 11, on which first solid electrolyte layer 14 is formed, is immersed in the second polymerization solution, and second solid electrolyte layer 21 is formed on first solid electrolyte layer 14 by applying an electric current through first solid electrolyte layer 14. Polymerization conditions in the electrolytic polymerization method are not particularly limited, and known polymerization conditions for forming a solid electrolyte layer of a solid electrolytic capacitor by an electrolytic polymerization method can be applied.

Preferably, the second polymerization solution is heated at a temperature not lower than the melting point of the ionic compound contained in the second polymerization solution when positive electrode body 11 on which first solid electrolyte layer 14 is formed is impregnated with the second polymerization solution. Thereby, an effect similar to that obtained in the third exemplary embodiment can be obtained, which is that obtained when the first polymerization solution is heated at a temperature not lower than the melting point of the ionic compound contained in the first polymerization solution to impregnate positive electrode body 11 with the first polymerization solution. Conditions for impregnation of the second polymerization solution are not particularly limited, and conditions for impregnation of the first polymerization solution can be used.

(Formation of Negative Electrode Lead-Out Layer)

Next, a negative electrode lead-out layer including carbon layer 15 and silver paint layer 16 is formed on second solid electrolyte layer 21 in step S73 in FIG. 7. A method for forming carbon layer 15 and a method for forming silver paint layer 16 are not particularly limited, and the method for forming carbon layer 15 and the method for forming silver paint layer 16 as described in the first exemplary embodiment can be used.

In this exemplary embodiment, the melting point of the ionic compound is higher than the temperature of a suspension liquid containing a carbon powder in a step of applying the suspension liquid. Therefore, in this step, melting of the ionic compound can be prevented, so that the ionic compound can be prevented from flowing out of positive electrode body 11 on which second solid electrolyte layer 21 is formed.

When the negative electrode lead-out layer has been formed, a step of sealing a capacitor element (step S19 in FIG. 7) and an aging step (step S20 in FIG. 7) are performed in accordance with the method for sealing a capacitor element as described in the first exemplary embodiment. In this way, the solid electrolytic capacitor according to this exemplary embodiment is manufactured.

In the method for manufacturing a solid electrolytic capacitor according to this exemplary embodiment, the melting point of the ionic compound is higher than the temperature of a suspension liquid containing a carbon powder in a step of applying the suspension liquid, and is higher than the temperature of a liquid containing a metal powder in a step of applying the liquid. And the melting point of the ionic compound is preferably equal to or lower than the treatment temperature in the aging step. Accordingly, capacitor element 10 can be manufactured without causing outflow of the ionic compound. In the manufactured solid electrolytic capacitor, the ionic compound can also serve as an electrolytic solution. Therefore, an effect similar to that in the first exemplary embodiment can be obtained when a solid electrolytic capacitor is manufactured in accordance with the method for manufacturing a solid electrolytic capacitor according to this exemplary embodiment.

The solid electrolytic capacitor of the present disclosure has been described in each of the above first to fourth exemplary embodiments, but the solid electrolytic capacitor of the present disclosure is not limited to the solid electrolytic capacitors according to the first to fourth exemplary embodiments, and can be applied in a known form. Examples of the known form are winding type solid electrolytic capacitors and laminate type solid electrolytic capacitors.

EXAMPLES

The present disclosure is described more in detail below by way of an example, but the present disclosure is not limited to the example.

Example 1

Formation of Positive Electrode Body

First, a tantalum powder was prepared, and the tantalum powder was molded into a rectangular solid while one end part of a rod-shaped positive electrode lead made of tantalum, in a longitudinal direction, was embedded in the tantalum powder. Then, the molded product was sintered to form a positive electrode body of porous structure in which one end part of the positive electrode lead was embedded. At this time, the positive electrode body had a size of 4.5 mm (length)×3.5 mm (width)×2.5 mm (height).

(Formation of Dielectric Film)

Next, the positive electrode body was immersed in a phosphoric acid solution, and a voltage of 30 V was applied to the positive electrode body through the positive electrode lead. A dielectric film made of $Ta_2O_5$ was thereby formed on a surface of the positive electrode body.

(Formation of First Solid Electrolyte Layer)

Next, a first solid electrolyte layer was formed by a chemical polymerization method. Specifically, first, an ethanol solution containing pyrrole in a concentration of 0.03 mol/L and an aqueous solution containing ammonium persulfate and p-toluenesulfonic acid were prepared as a polymerization solution. Then, the positive electrode body on which the dielectric film was formed was immersed in the ethanol solution and the aqueous solution in this order, and the positive electrode body was drawn up from the aqueous solution, and left standing at room temperature. A first solid electrolyte layer made of polypyrrole was thereby formed on the dielectric film.

(Melting, Impregnation and Solidification of Ionic Compound)

Next, the positive electrode body on which the first solid electrolyte layer was formed was impregnated with a melted ionic compound. Specifically, first, an ionic compound was prepared. The prepared ionic compound had as a cation an ammonium ion containing a hydroxyl group of a functional group, and had as an anion a bis(trifluoromethanesulfonyl) imide ion, and the melting point of the ionic compound was 33° C. The ionic compound was melted, and the melted ionic compound was held at 40° C. Next, the positive electrode body on which the first solid electrolyte layer was formed was immersed for 5 minutes in the ionic compound held at 40° C. The positive electrode body was thereby impregnated with the melted ionic compound. Thereafter, the positive electrode body was drawn up from the melted ionic compound, and then left standing at room temperature for 10 minutes or more. The ionic compound was thereby solidified.

(Formation of Second Solid Electrolyte Layer)

Next, a second solid electrolyte layer was formed by an electrolytic polymerization method. Specifically, first, an aqueous solution containing pyrrole and an alkylnaphthalenesulfonic acid each in a concentration of 0.03 mol/L was prepared as an electrolytic polymerization solution. A bath for electrolytic reaction in an electrolytic polymerization apparatus was filled with the aqueous solution, and the positive electrode body impregnated with the ionic compound was immersed in the aqueous solution. Then, a current of 0.5 mA was supplied to the first solid electrolyte layer for 3 hours. At this time, the temperature of the electrolytic polymerization solution in the bath for electrolytic reaction was 25° C. A second solid electrolyte layer made of polypyrrole was thereby formed on the first solid electrolyte layer.

(Formation of Negative Electrode Lead-Out Layer)

Next, a liquid containing graphite particles was applied onto the second solid electrolyte layer, and dried. At this time, the temperature of the liquid containing graphite particles was 25° C. A carbon layer was thereby formed on the second solid electrolyte layer. Thereafter, a silver paint layer was formed on the carbon layer using a liquid containing silver particles. At this time, the temperature of the liquid containing silver particles was 25° C. A capacitor element was manufactured through these operations.

(Sealing of Capacitor Element)

In the capacitor element, a positive electrode terminal made of copper was welded to the positive electrode lead, a silver adhesive was applied to the silver paint layer to form an adhesive layer, and one end part of a negative electrode terminal made of copper was bonded to the adhesive layer. Next, the capacitor element was sealed with an outer packaging resin so that a part of each of the positive electrode terminal and the negative electrode terminal was exposed. The positive electrode terminal and the negative electrode terminal each exposed from the outer packaging resin were bent so as to extend along the outer packaging resin.

(Aging)

A rated voltage (10 V) was applied to the positive electrode body and the negative electrode lead-out layer, and they were held at 120° C. for 1 hour. In this way, the solid electrolytic capacitor of Example 1 was manufactured. The manufactured solid electrolytic capacitor had a size of 7.3 mm (length)×4.3 mm (width)×3.8 mm (height).

Comparative Example 1

A solid electrolytic capacitor of Comparative Example 1 was manufactured in accordance with the method described in Example 1 except that melting, impregnation and solidification of the ionic compound were not performed.

Comparative Example 2

A solid electrolytic capacitor of Comparative Example 1 was manufactured in accordance with the method described in Example 1 except that an ionic liquid was used instead of the ionic compound, melting and solidification of the ionic compound were not performed, and a positive electrode body on which a first solid electrolyte layer was formed was impregnated with the ionic liquid at room temperature. The prepared ionic liquid had a pyridinium ion as a cation and a bis(trifluoromethanesulfonyl)imide ion as an anion, and did not contain a hydrophilic group. The melting point of the ionic liquid was 12° C.

<Measurement of Capacity>

Twenty solid electrolytic capacitors were randomly extracted from the solid electrolytic capacitors of each of Example 1 and Comparative Examples 1 and 2. For each extracted solid electrolytic capacitor, the capacity of the solid electrolytic capacitor at a frequency of 120 Hz was measured using an LCR (inductance-capacitance-resistance) meter for four-terminal measurement, and an average in each of Example 1 and Comparative Examples 1 and 2 was calculated. The results are shown in Table 1.

<Measurement of ESR (Equivalent Series Resistance)>

Twenty solid electrolytic capacitors were randomly extracted from the solid electrolytic capacitors of each of Example 1 and Comparative Examples 1 and 2. For each extracted solid electrolytic capacitor, an ESR (mΩ) of the solid electrolytic capacitor at a frequency of 100 kHz was measured using an LCR meter for four-terminal measurement, and an average in each of Example 1 and Comparative Examples 1 and 2 was calculated. The results are shown in Table 1.

<Measurement of LC (Inductance-Capacitance)>

Twenty solid electrolytic capacitors were randomly extracted from the solid electrolytic capacitors of each of Example 1 and Comparative Examples 1 and 2. A resistor of 1 kΩ was connected in series to each extracted solid electrolytic capacitor, a voltmeter was connected in parallel to the resistor, a rated voltage was applied to produce a current, and a value of the current was measured. The results are shown in Table 1.

TABLE 1

| | Melting point of ionic compound/ionic liquid (° C.) | Temperature of electrolytic polymerization solution (° C.) | Capacity (μF) | ESR (mΩ) | LC (μA) |
| --- | --- | --- | --- | --- | --- |
| Example 1 | 33 | 25 | 108 | 112 | 16 |
| Comparative Example 1 | — | 25 | 100 | 100 | 100 |
| Comparative Example 2 | 12 | 25 | 88 | 194 | 4 |

As shown in Table 1, Example 1 had a higher capacity and a lower LC as compared to Comparative Example 1. A probable reason for this is as follows. In Example 1, the first solid electrolyte layer is impregnated with an ionic compound. It is considered that the ionic compound can also serve as an electrolyte because it has ion conductivity. On the other hand, it is considered that in Comparative Example 1, merely polypyrrole that forms the first solid electrolyte layer and the second solid electrolyte layer serves as an electrolyte because an ionic compound is not contained.

In Example 1, the ESR only slightly increased as compared to Comparative Example 1. Thus, it can be said that in Example 1, an increase in ESR due to addition of the ionic compound is restrained.

Example 1 had a higher capacity and a lower ESR as compared to Comparative Example 2. It is considered that in Example 1, outflow of the ionic compound in the step of forming the second solid electrolyte layer was prevented because the melting point of the ionic compound was higher than the temperature of the electrolytic polymerization solution in the step of impregnation of the electrolytic polymerization solution ("temperature of electrolytic polymerization solution" in Table 1). On the other hand, it is considered that in Comparative Example 2, outflow of the ionic compound in the step of forming the second solid electrolyte layer was not prevented because the melting point of the ionic compound was equal to or lower than the temperature of the electrolytic polymerization solution in the step of impregnation of the electrolytic polymerization solution.

The exemplary embodiments and examples disclosed herein should be construed to be illustrative in all respects and not restrictive. The scope of the present disclosure is not shown by the above descriptions, but by claims, and is intended to include all modifications within the meanings and scope equivalent to claims.

What is claimed is:

1. A method for manufacturing a solid electrolytic capacitor which comprises a capacitor element including: a positive electrode body on which a dielectric film is formed; and a solid electrolyte layer formed over the positive electrode body, the method comprising the steps of:
   forming the dielectric film on the positive electrode body;
   forming the solid electrolyte layer over the positive electrode body;
   heating and melting an ionic compound;
   impregnating the positive electrode body with the melted ionic compound;
   cooling and solidifying the ionic compound after impregnating the positive electrode body with the ionic compound; and
   forming, on the solid electrolyte layer, a second solid electrolyte layer different from the solid electrolyte layer after solidifying the ionic compound, wherein:
   the step of forming the second solid electrolyte layer includes a step of impregnating the positive electrode body with a liquid composition containing a conductive polymer or a precursor of a conductive polymer, and
   a melting point of the ionic compound is higher than a temperature of the liquid composition in the step of impregnating the positive electrode body with the liquid composition.

2. The method for manufacturing a solid electrolytic capacitor according to claim 1, wherein the step of impregnating the positive electrode body with the melted ionic compound is performed after the step of forming the solid electrolyte layer.

3. The method for manufacturing a solid electrolytic capacitor according to claim 2, the method comprising, after solidifying the ionic compound, a step of applying over the solid electrolyte layer a liquid containing a carbon powder or a metal powder, wherein
   the melting point of the ionic compound is higher than a temperature of the liquid containing the carbon powder or the metal powder.

4. The method for manufacturing a solid electrolytic capacitor according to claim 1, wherein the melting point of the ionic compound is 30° C. or higher.

5. The method for manufacturing a solid electrolytic capacitor according to claim 1, the method comprising, after impregnating the positive electrode body with the ionic compound, an aging step of applying a predetermined voltage to the capacitor element, wherein
   the aging step is performed at a temperature equal to or higher than the melting point of the ionic compound.

6. The method for manufacturing a solid electrolytic capacitor according to claim 5, wherein the melting point of the ionic compound is 100° C. or lower.

7. The method for manufacturing a solid electrolytic capacitor according to claim 1, wherein the ionic compound contains at least one of a hydroxyl group, a carboxyl group, a sulfonic acid group, and a phosphonic acid group.

8. The method for manufacturing a solid electrolytic capacitor according to claim 1, wherein the ionic compound contains a cation having quaternary nitrogen.

9. A method for manufacturing a solid electrolytic capacitor which comprises a capacitor element including: a positive electrode body on which a dielectric film is formed; and a solid electrolyte layer formed over the positive electrode body, the method comprising the steps of:
   forming the dielectric film on the positive electrode body; and
   impregnating the positive electrode body, on which the dielectric film is formed, with a liquid composition containing a conductive polymer or a precursor of a conductive polymer and an ionic compound having a melting point of 30° C. or higher, to form the solid electrolyte layer made of the conductive polymer, wherein
   the positive electrode body on which the dielectric film is formed is impregnated with the ionic compound in a melted state.

10. The method for manufacturing a solid electrolytic capacitor according to claim 9, wherein the step of forming the solid electrolyte layer comprises forming the solid electrolyte layer by chemical polymerization or electrolytic polymerization.

11. The method for manufacturing a solid electrolytic capacitor according to claim 9, wherein the positive electrode body on which the dielectric film is formed is impregnated with the ionic compound with the ionic compound heated to a temperature equal to or higher than the melting point of the ionic compound.

12. The method for manufacturing a solid electrolytic capacitor according to claim 9, the method comprising, after forming the solid electrolyte layer, a step of applying on the solid electrolyte layer a suspension liquid containing a carbon powder, wherein
   the melting point of the ionic compound is higher than a temperature of the suspension liquid in the step of applying the suspension liquid.

13. The method for manufacturing a solid electrolytic capacitor according to claim 9, the method comprising an aging step of applying a predetermined voltage to the capacitor element, wherein
   the aging step is performed at a temperature equal to or higher than the melting point of the ionic compound.

14. The method for manufacturing a solid electrolytic capacitor according to claim 13, wherein the melting point of the ionic compound is 100° C. or lower.

15. A method for manufacturing a solid electrolytic capacitor which comprises a capacitor element including: a positive electrode body on which a dielectric film is formed; and a solid electrolyte layer formed over the positive electrode body, the method comprising the steps of:
   forming the dielectric film on the positive electrode body;
   forming the solid electrolyte layer over the positive electrode body;
   heating and melting an ionic compound;
   impregnating the positive electrode body with the melted ionic compound;
   cooling and solidifying the ionic compound after impregnating the positive electrode body with the ionic compound; and
   applying over the solid electrolyte layer a liquid containing a carbon powder or a metal powder after solidifying the ionic compound, wherein:
   impregnating the positive electrode body with the melted ionic compound is performed after forming the solid electrolyte layer, and
   a melting point of the ionic compound is higher than a temperature of the liquid containing the carbon powder or the metal powder in the step of applying over the solid electrolyte layer the liquid containing the carbon powder or the metal powder.

16. A method for manufacturing a solid electrolytic capacitor which comprises a capacitor element including: a positive electrode body on which a dielectric film is formed;

and a solid electrolyte layer formed over the positive electrode body, the method comprising the steps of:

forming the dielectric film on the positive electrode body;

heating and melting an ionic compound;

impregnating the positive electrode body with the melted ionic compound;

cooling and solidifying the ionic compound after impregnating the positive electrode body with the ionic compound, and forming the solid electrolyte layer over the positive electrode body after the step of cooling and solidifying the ionic compound, wherein the step of impregnating the positive electrode body with the melted ionic compound is performed immediately after the step of forming the dielectric film on the positive electrode body.

17. The method for manufacturing a solid electrolytic capacitor according to claim 16, wherein the step of forming the solid electrolyte layer includes a step of impregnating the positive electrode body with a liquid composition containing a conductive polymer or a precursor of a conductive polymer, and a melting point of the ionic compound is higher than a temperature of the liquid composition in the step of impregnating the positive electrode body with the liquid composition.

* * * * *